United States Patent
Cai

(10) Patent No.: US 10,325,128 B1
(45) Date of Patent: Jun. 18, 2019

(54) LONG RANGE BARCODE SCANNING

(71) Applicant: Amazon Technologies, Inc., Seattle, WA (US)

(72) Inventor: Joseph Cai, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/591,847

(22) Filed: May 10, 2017

(51) Int. Cl.
    *G06K 7/10*     (2006.01)
    *G06K 7/14*     (2006.01)
    *G06K 19/06*     (2006.01)

(52) U.S. Cl.
    CPC ...... *G06K 7/10811* (2013.01); *G06K 7/10732* (2013.01); *G06K 7/1417* (2013.01); *G06K 19/06037* (2013.01)

(58) Field of Classification Search
    CPC .......... G06K 7/10811; G06K 7/10732; G06K 7/1417; G06K 19/06037
    USPC ............................ 235/462.11, 462.01–462.49
    See application file for complete search history.

(56) References Cited

U.S. PATENT DOCUMENTS

| | | | | |
|---|---|---|---|---|
| 5,504,318 A * | 4/1996 | Joseph | ..................... | G06K 7/14 235/454 |
| 5,949,054 A * | 9/1999 | Karpen | .............. | G06K 7/10851 235/462.01 |
| 9,607,200 B2 * | 3/2017 | Bachelder, IV | ..... | G06K 7/1452 |
| 2005/0103864 A1 * | 5/2005 | Zhu | ..................... | G06K 7/10732 235/462.42 |
| 2006/0022047 A1 * | 2/2006 | Sewell | ..................... | G06K 7/10 235/454 |
| 2006/0266836 A1 * | 11/2006 | Bilcu | ..................... | G06T 5/002 235/462.16 |
| 2016/0104022 A1 * | 4/2016 | Negro | .................. | G06K 7/1452 235/462.16 |

* cited by examiner

*Primary Examiner* — Daniel A Hess
(74) *Attorney, Agent, or Firm* — Eversheds Sutherland (US) LLP

(57) ABSTRACT

Systems, methods, and computer-readable media are disclosed for long range barcode scanning. In one embodiment, an example method may include determining a signal representative of a portion of light reflected from a barcode, determining respective values at one or more valleys and peaks of the signal, determining that a first peak represents a first narrow barcode element of the barcode, and determining that the third peak represents a second narrow barcode element of the barcode. Example methods may include determining a first edge position of the first narrow barcode element along a first portion of the signal, determining a second edge position of the second narrow barcode element along a second portion of the signal, and determining a path between the first edge position to the second edge position.

20 Claims, 8 Drawing Sheets

LONG RANGE BARCODE SCANNING

BACKGROUND

Product and service identifiers may include barcodes, matrix codes, and other forms of identifiers that can be read or decoded by electronic devices. Electronic devices may use cameras, sensors, and other components to detect and/or read product identifiers. To read barcodes, devices may use components that have limited range, or distances at which barcodes can be accurately read or decoded. As a result, users of the device may have to position the device relatively close to a barcode. However, long range barcode scanning, or reading barcodes using a device that is positioned relatively further away from a barcode, may be desired and may improve a user's experience with the device.

Figure 1:
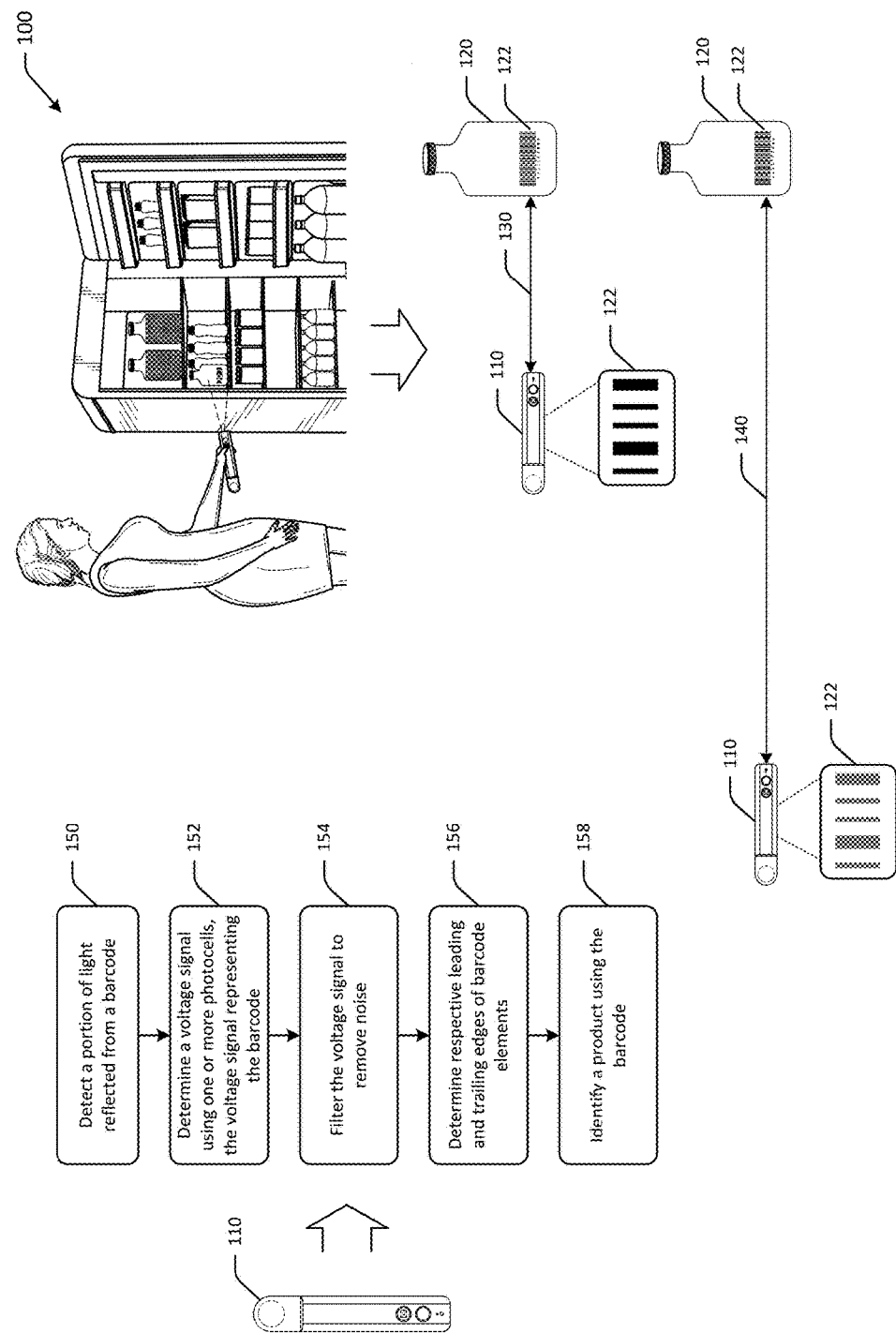
FIG. 1 is an example use case and schematic drawing of a device configured to read barcodes from long range in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Products may include product identifiers, such as barcodes (e.g., one-dimensional barcodes, two-dimensional barcodes, etc.), Quick Response (QR) codes, matrix codes, alphanumeric codes, and other identifiers that may be used to identify a product or a product characteristic, such as a batch number, a manufacturer, a model or serial number, and other characteristics. Product identifiers may be read, scanned, or otherwise decoded using an electronic device. For example, a barcode scanner may detect a barcode, decode or read the barcode, and determine a product associated with the barcode. To read the barcode, the barcode scanner may emit a light and capture at least a portion of the reflected light. A resulting analog or digital signal may be processed to determine or decode the barcode, and an associated product may be identified.

A distance from which a product identifier can be read or decoded may be dependent, at least in part, on the electronic device used to read the barcode. For example, electronic devices that use cameras to read product identifiers may be configured to detect and/or read barcodes or other product identifiers from a distance based on the functionality of the camera, whereas electronic devices that use optical sensors or other components may be configured to detect and/or read barcodes or other product identifiers from a distance based on the functionality of the optical sensor or other components. Users of electronic devices, however, may desire to use electronic devices to read or decode product identifiers from increased distances, so as to increase convenience and/or improve a user's experience.

Embodiments of the disclosure may include electronic devices that are configured to detect and read barcodes and other product identifiers from increased distances while using the same or similar hardware components. The techniques, methods, and processes described herein may be used to detect and/or read barcodes and other product identifiers from long range, or distances at which barcodes may otherwise be out of focus. For example, certain electronic devices may be configured to detect barcodes at distances of about 8 inches, and at greater distances, the barcode may appear blurry or otherwise out of focus. Embodiments of the disclosure may be configured to process a signal representative of the barcode so as to accurately detect and read the barcode or product identifier, even in instances where the barcode or product identifier may be out of range or appear blurry. While described in the context of barcodes, this disclosure is more broadly applicable to other product identifiers, such as matrix codes, numbers, and other two-dimensional product identifiers.

This disclosure relates to, among other things, systems, methods, computer-readable media, techniques, and methodologies for long range barcode scanning. Embodiments may include barcode scanners that accurately detect the edges of barcode elements, so as to accurately detect and/or determine the widths of barcode elements and the corresponding light colored gaps or spaces. Barcode elements may include dark barcode elements, such as black bars, and light barcode elements, such as white spaces. The light barcode elements may be positioned between the dark barcode elements. Some embodiments include using evaluations or processing of signals to reduce or remove signal noise. As a result, barcode detection and reading may be improved at greater distances than other devices. Certain embodiments may detect specula and/or the presence of other errors and may generate notifications for users to rescan or otherwise attempt to scan or decode a product identifier.

Referring to FIG. 1, an example use case 100 and schematic drawing of an electronic device configured for long range barcode scanning is depicted in accordance with one or more embodiments of the disclosure. A scanning device 110 may be a device that is configured to detect and/or read a barcode or other product identifier. For example, the scanning device 110 may include one or more light emitting diodes (LEDs), one or more sensors, (e.g., one or more photocells, one or more 1D sensors, one or more 2D sensors, etc.), one or more batteries, and other components. Some embodiments may include optional buttons or other actuation devices, microphones, indicators, controllers, and/or other components.

The scanning device 110 may be used to detect and/or read barcodes or other product identifiers. For example, in the use case 100, a user may use the scanning device 110 to identify a bottle of orange juice 120 in a refrigerator. The bottle of orange juice 120 may include a barcode 122 that can be used to identify one or more aspects or characteristics of the bottle of orange juice 120. For example, the user may reorder the bottle of orange juice 120 after scanning or otherwise identifying the barcode 122.

To read or decode the barcode 122, the user may use the scanning device 110. In the illustrated example, the user may press a button on the scanning device 110. The scanning device 110 may emit a light using the LED. The light may impinge on a surface of the product, or the bottle of orange juice 120, that includes the barcode 122. At least a portion of the light may be reflected from the barcode 122. The scanning device 110 may detect at least a portion of the reflected light using, for example, one or more photocell or another optical sensor. The sensor output may be a sequential output of each photocell and/or pixel, and may be represented as a voltage value. The voltage may be proportional to the reflected light. The sensor output may be used to determine a signal, such as a digital signal or a voltage signal, that represents the reflected light captured by the photocell. In one embodiment, the output of the photocell may be various voltage readings at different pixels of the photocell. The signal may be processed by the scanning device 110, or may be sent to another computer system for processing, in order to determine or decode the barcode 122 and/or identify the related product.

As illustrated in FIG. 1, at a first distance 130, the barcode 122 may appear clear to the scanning device 110, or may otherwise be easily decipherable using the photocell or other component. However, at a second distance 140 that is greater than the first distance 130, the barcode 122 may appear less clear or may otherwise be more difficult to decipher or decode. In some embodiments, signal noise (e.g., portions of the signal, such as modulations, that do not correspond to a barcode, etc.) may increase as a distance between the scanning device 110 and the barcode 122 increases. Accordingly, reading or decoding the barcode 122 may be relatively more difficult than reading or decoding the barcode 122 at a closer distance.

To detect or read the barcode 122 from long range (e.g., a distance at which the barcode or product identifier may otherwise be unreadable, etc.), such as the second distance 140, the scanning device 110 may perform one or more operations. In some embodiments, the scanning device 110 may communicate with another computer system that performs some or all of the operations.

At a first operation 150, the scanning device 110 may detect a portion of light reflected from a barcode. For example, the scanning device 110 may emit light in the direction of the barcode 122 using an LED, and the scanning device 110 may use one or more photocells to detect at least a portion of the light that is reflected from the barcode 122.

At a second operation 152, the scanning device 110 may determine a voltage signal using one or more photocells, the voltage signal at least partially representing the barcode. The voltage signal may be a voltage measurement at one or more pixels or photocells of the optical sensor in the example of FIG. 1.

At a third operation 154, the scanning device 110 may filter the voltage signal to remove noise. For example, the scanning device 110 may determine a difference in voltage values between peaks and troughs or valleys of the voltage signal to determine a signal noise threshold. Peaks may be local maximum values of the voltage signal, while troughs or valleys may be local minimum values of the voltage signal. For example, the scanning device 110 may filter the voltage signal by determining that peak-to-valley differences of less than 0.1 volt represent signal noise, and such peaks and/or valleys may be discarded or ignored during processing of the voltage signal and/or decoding of the barcode 122. Peaks may represent light colors, or spaces, while valleys may represent dark colors, or barcode elements, in one example. In other embodiments, peaks may represent dark colors, and valleys may represent light colors. In another example, the scanning device 110 may filter the voltage signal by determining whether specula signal noise is present, and/or by determining which portion of the voltage signal represents the barcode 122, and which portion(s) of the voltage signal may represent an ambient environment of the barcode 122.

At a fourth operation 156, the scanning device 110 may determine respective leading and trailing edges of the barcode elements. A leading edge may be a first edge of a barcode element, or a portion of a barcode (e.g., a relatively dark or black element of a barcode having a width, etc.), and a trailing edge may be a second edge of the barcode element. The leading edge may be parallel to, or substantially parallel to, the trailing edge in some embodiments. Using the leading and trailing edges of a barcode element, the scanning device 110 may determine a width of the barcode element, as well as, in some instances, a distance or gap between adjacent barcode elements. The widths of the barcode elements, along with the widths of gaps or spaces between the barcode elements, may be used to represent a product identifier. Gaps or spaces may be relatively lighter color spaces, such as white space, between the barcode elements. The leading edge and/or trailing edge of a barcode element may be determined based at least in part on processing of the signal output from the sensor. For example, a first derivative or second derivative of the signal may be determined and used to identify one or more edges of a barcode element. Edge detection or location may include histograms and other signal processing techniques, as well as detecting specula or other signal errors.

At a fifth operation 158, the scanning device 110 may identify a product using the barcode. For example, based at least in part on the respective leading and trailing edges of the barcode elements, respective widths of the barcode elements, along with widths between the respective barcode elements, may be determined and used to identify, in a database for example, a related or associated product.

In some embodiments, for each character in a barcode (e.g., a UPC barcode characters may have 4 elements, etc.) determined widths may be normalized and compared to one or more known character patterns. For example, UPC barcodes may have twenty character patterns, and the normalized widths may be compared to one or more, or each, of the twenty character patterns to determine or identify a closest match. The closest match or the known pattern that has the least distance may be determined to be the decoded result.

A checksum calculation may be performed for some barcodes. The checksum may be used to determine accurate decoding of a barcode and may trigger a second scan, if needed. In some embodiments, the scanning device may use a redundancy process in which a barcode is scanned more than once and the decoded result is reported if the result is consistent (e.g., occurs twice, three times, etc.).

As a result, the performance or functionality of the scanning device 110 may be improved, and the barcodes may be read and/or decoded from greater distances regardless of an initial signal quality. In addition, performance may be improved without changes to hardware specifications in some embodiments. Certain embodiments may more accurately determine barcodes from greater distances in reduced amounts of time by reducing a number of verifications that are performed. Certain embodiments may detect errors, such as specula errors, and may generate notifications for rescanning a barcode. Some embodiments may filter signals to remove signal noise and portions of a signal that do not correspond to a barcode.

Example embodiments of the disclosure provide a number of technical features or technical effects. For example, in accordance with example embodiments of the disclosure, certain embodiments of the disclosure may process signals to remove signal noise, determine barcode element edges, determine barcodes, detect barcode edges, and determine products associated with barcodes or other product identifiers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
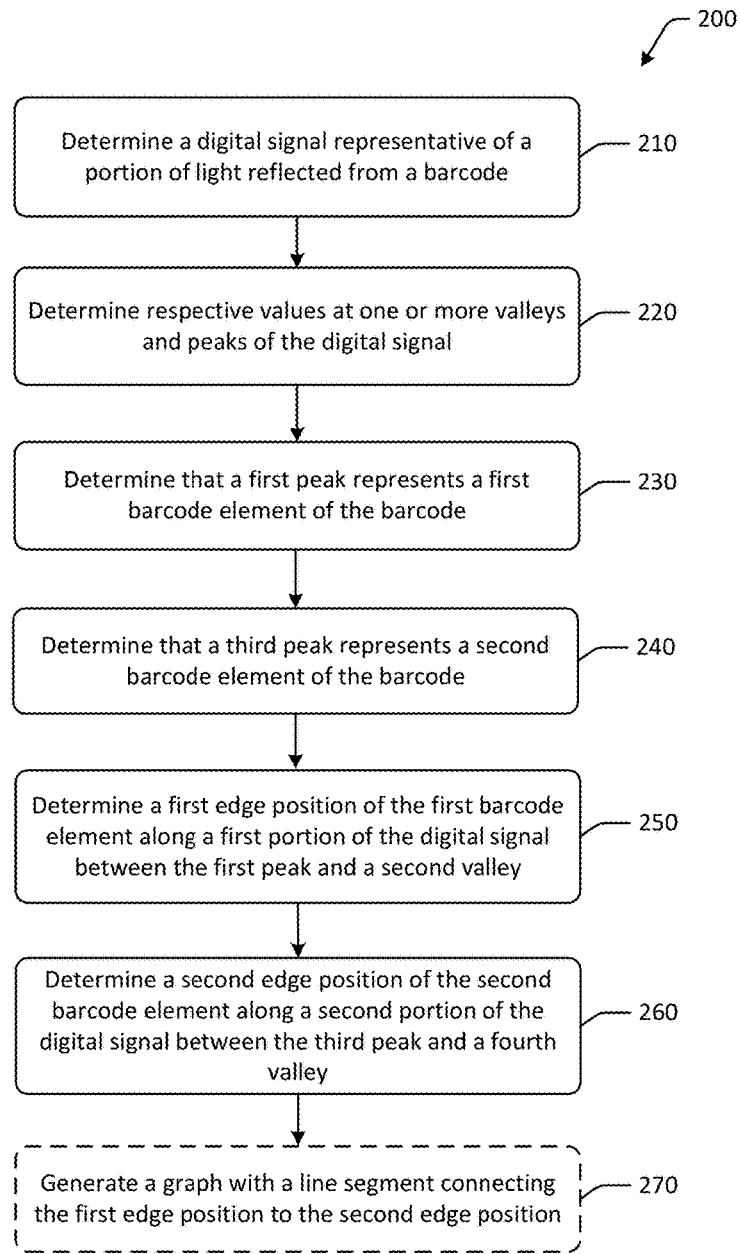
FIG. 2 is an example process flow for long range barcode scanning in accordance with one or more embodiments of the disclosure.

Referring to FIG. 2, an example process flow 200 for long range barcode scanning is depicted in accordance with one or more embodiments of the disclosure. The process flow 200 may be used, in one example, to determine or locate the edges of one or more barcode elements. While FIG. 2 includes a number of operations, the operations may be performed in any order, and some embodiments may include additional or fewer operations.

At block 210 of the process flow 200, a digital signal representative of a portion of light reflected from a barcode may be determined. For example, one or more computer processors may cause one or more LEDs or other light sources of a scanning device to emit light toward a barcode on a surface of an object or product. At least a portion of the emitted light may be reflected from the barcode on the surface of the object. Some or all of the reflected light may be detected and/or measured by one or more sensors, such as an optical sensor with one or more photocells, a photo sensor, and the like. The one or more computer processors may use a sensor output to determine a digital signal representative of at least a portion of the light reflected from the barcode. In some instances, the sensor may output the digital signal, while in other instances the sensor may output an analog signal that may be processed or converted to a digital signal. For example, one or more photocells may be configured to output a voltage signal representative of the portion of the light captured or detected by the photocell. In some embodiments, the sensor may output, or the computer processor may determine, a voltage signal that represents a voltage reading of the sensor at various pixel locations. In one embodiment, computer-executable instructions of one or more barcode detection module(s) stored at a server or locally on a scanning device may be executed to determine a digital signal representative of a portion of light reflected from a barcode.

At block 220 of the process flow 200, respective values at one or more valleys and peaks of the digital signal may be determined. For example, the digital signal may be analyzed to detect one or more valleys and peaks of the digital signal. A valley may be a local low point or trough of the digital signal, while a peak may be a local high point or peak of the digital signal. The determined values may be voltage values or other values that may be an output of the photocell or other light measurement device. In one embodiment, the computer-executable instructions of one or more barcode detection module(s) stored at a server or locally on a scanning device may be executed to determine the respective voltage values of one or more peaks and valleys of the digital signal. For example, a voltage signal may include a first valley associated with a first voltage value, a first peak adjacent to the first valley and associated with a second voltage value, a second valley adjacent to the first peak and associated with a third voltage value, a second peak adjacent to the second valley and associated with a fourth voltage value, a third valley adjacent to the second peak and associated with a fifth voltage value, a third peak adjacent to the third valley and associated with a sixth voltage value, and a fourth valley adjacent to the third peak and associated with a seventh voltage value. Other digital signals may include additional or fewer peaks and/or valleys. In some embodiments, peaks and valleys may be identified using an edge detection algorithm.

At block 230 of the process flow 200, it may be determined that a first peak represents a first barcode element of the barcode. The first barcode element may be a narrow barcode element. For example, based at least in part on a peak of the digital signal and adjacent valleys, one or more computer processors may determine that a first peak represents a first narrow barcode element of the barcode. The narrow barcode element may be a black barcode element or may be another color that is darker than a color of spaces between consecutive barcode elements. A narrow barcode element may be a barcode element having a minimum element width. Minimum element widths may be determined using a standard, such as a Universal Product Code (UPC) standard, a code 39 standard, or another standard, or may be determined as ratios of wide barcode elements. For example, a narrow barcode element may have a width that is a 1:2, 1:3, or other ratio with respect to a wide barcode element. Spaces or gaps between barcode elements may also be narrow spaces or wide spaces. In some instances, peaks may correspond to spaces (e.g., white or light colored portions of a barcode, etc.), and valleys correspond to dark barcode elements, while in other instances, the inverse may apply.

In one embodiment, computer-executable instructions of one or more barcode detection module(s) stored at a server or locally on a scanning device may be executed to determine that a first peak represents a first narrow barcode element of the barcode. For example, the barcode detection module(s) may be executed to determine voltage differences between adjacent peaks and valleys of the digital signal. A difference may be determined, in one example, by subtracting a peak voltage value from a valley voltage value, or by subtracting a valley voltage value from a peak voltage value. The difference values may be compared to a narrow barcode element threshold to determine whether the peak corresponds to a narrow barcode element. The narrow barcode element threshold may be a numerical value or other representation that indicates that the peak corresponds to a narrow barcode element. In one example, if the difference between a peak value and the two adjacent valley values satisfy the narrow barcode element threshold, the peak may be determined to correspond to a narrow barcode element. In one example, the computer processors may determine that a first difference in voltage between the first voltage value of the first valley and the second voltage value of the first peak is less than or equal to a narrow barcode element threshold, and that a second difference in voltage between the second voltage value of the first peak and the third voltage value of the second valley is less than or equal to the narrow barcode element threshold. As a result, the first peak may be determined to correspond to a narrow barcode element.

At block 240 of the process flow 200, it may be determined that a third peak represents a second barcode element of the barcode. The second barcode element may be a narrow barcode element. In one embodiment, the computer-executable instructions of one or more barcode detection module(s) stored at a server or locally on a scanning device may be executed to determine that a third peak represents a second narrow barcode element of the barcode. The second peak may be positioned between the first peak and the third peak in the digital signal in this example. For example, the barcode detection module(s) may be executed to determine that a third difference in voltage between the fifth voltage value of the third valley and the sixth voltage value of the third peak is less than or equal to the narrow barcode element threshold, and that a fourth difference in voltage between the sixth voltage value of the third peak and the seventh voltage value of the fourth valley is less than or equal to the narrow barcode element threshold. The third peak may therefore be determined to correspond to a second narrow barcode element.

At block 250 of the process flow 200, a first edge position of the first barcode element may be determined along a first portion of the digital signal between the first peak and a second valley. Edge positions of barcode elements may be determined using the digital signal. In some embodiments, the edge positions may be determined using a midpoint of a digital signal between a peak and a valley, while in other embodiments, the edge positions may be determined based at least in part on an intersection point between a line segment and a portion of the digital segment. In one embodiment, the computer-executable instructions of one or more edge detection module(s) stored at a server or locally on a scanning device may be executed to determine a first midpoint of the voltage signal or digital signal between the first valley and the first peak. The first midpoint may be determined to be, or otherwise correspond to, a first edge of the first narrow barcode element. The first edge may be a leading edge of the first narrow barcode element.

In some embodiments, instead of a line segment, a path may be determined between adjacent midpoints or edge locations, and an intersection or cross point between the signal and the path may be determined. The path may be determined, in one example, using respective coordinates of the adjacent midpoints, and determining coordinate of an intersection between the path at a point of intersection with the signal.

At block 260 of the process flow 200, a second edge position of the second barcode element may be determined along a second portion of the digital signal between the third peak and a fourth valley. For example, computer-executable instructions of one or more edge detection module(s) stored at a server or locally on a scanning device may be executed to determine a second midpoint of the voltage signal or digital signal between the first peak and the second valley. The second midpoint may be determined to be, or may otherwise correspond to, a second edge of the first narrow barcode element. The second edge may be a trailing edge of the second narrow barcode element.

In some embodiments, midpoints may be used to determine edges of the second narrow barcode element. For example, the one or more computer processors may determine a third midpoint of the voltage signal or digital signal between the third valley and the third peak, where the third midpoint corresponds to a first edge of the second narrow barcode element, as well as determine a fourth midpoint of the voltage signal or digital signal between the third peak and the fourth valley, where the fourth midpoint corresponds to a second edge of the second narrow barcode element.

At optional block 270 of the process flow 200, a graph may be generated with a line segment connecting the first edge position to the second edge position. The graph may be determined based at least in part on the digital signal representing the barcode. In some instances, the graph may include line segments that are overlaid on the digital signal. The digital signal may be incorporated into the graph in some embodiments. In one embodiment, computer-executable instructions of one or more signal processing module(s) stored at a server or locally on a scanning device may be executed to determine a graph with a first line segment connecting the first midpoint to the second midpoint, a second line segment connecting the second midpoint to the third midpoint, and a third line segment connecting the third midpoint to the fourth midpoint. The line segments may connect the midpoints of respective narrow barcode elements. In some embodiments, the line segments may connect a trailing edge midpoint of a first narrow barcode element to an adjacent leading edge midpoint of a second, or adjacent, narrow barcode element. In such instances, the midpoints of the leading and trailing edges of the consecutive narrow barcode elements may be connected with line segments. For example, the signal processing module(s) may be executed to generate a graph with a line segment connecting a first edge position to a second edge position. The line segments may be positioned so that peak values of respective narrow or wide barcode elements are greater than values of respective local line segments. Some embodiments may not include the line segment, and may instead determine a path between the adjacent edge locations.

For example, the one or more computer processors may determine that the second peak of the digital signal represents a wide barcode element, and may determine that the second valley represents a first space adjacent to the first narrow barcode element. The one or more computer processors may determine that the third valley represents a second space adjacent to the second narrow barcode element, and may determine a product identifier using the first narrow barcode element, the first space, the wide barcode element, the second space, and the second narrow barcode element. For example, the respective widths and arrangement of the spaces and barcode elements may be used to decode the barcode. The decoded barcode may be used to identify, in one example, a related or associated product in a database. After the product is identified, the product may be ordered, automatically reordered, or other product information may be presented to the user, such as in an audible or visual format.

Figure 3:
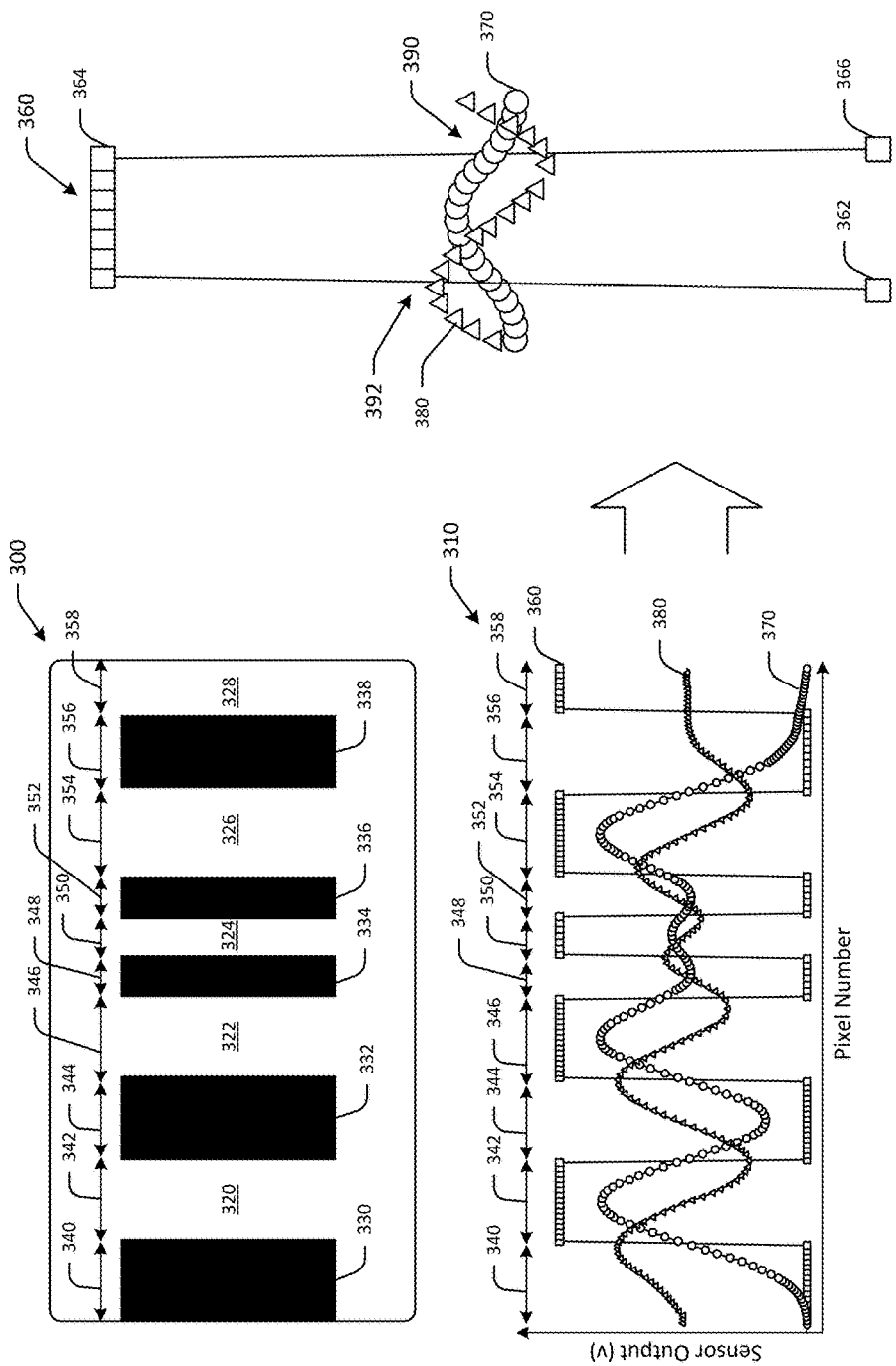
FIG. 3 is a schematic drawing of a signal used to read a barcode from long range in accordance with one or more embodiments of the disclosure.

FIG. 3 schematically depicts a digital signal that may be used to read or otherwise decode a barcode from long range in accordance with one or more embodiments of the disclosure. In FIG. 3, a barcode 300 may be scanned using a scanning device, such as the scanning device of FIG. 1. A digital signal 310 may be determined by the scanning device. In some embodiments, the digital signal 310 may be output from a component of the scanning device, such as one or more photocells. The digital signal 310 may depict a voltage measurement at one or more, or each, pixel of the one or more photocells, as denoted on the X axis of the digital signal 310.

The barcode 300 may include one or more barcode elements, which may include one or more dark or black colored elements and one or more white or light colored spaces. The barcode elements may be relatively darker than the spaces or gaps. The barcode elements, in some embodiments, may be narrow barcode elements or wide barcode elements. In some embodiments, one or more of the barcode elements may have unique widths or other dimensions. The respective widths of the barcode elements and spaces, as well as the arrangement of the barcode elements and spaces, may be used to encode product information. Decoding the barcode may therefore result in an associated product or product identifier.

The digital signal 310 may include values, such as voltage values, at pixels of one or more photocells of an optical sensor or other light detection device. The digital signal 310 may represent the barcode 300. For example, the barcode 300 may include a first barcode element 330, a second barcode element 332, a third barcode element 334, a fourth barcode element 336, and a fifth barcode element 338. The barcode 300 may include a first space 320, between the first barcode element 330 and the second barcode element 332, a second space 322 between the second barcode element 332 and the third barcode element 334, a third space 324 between the third barcode element 334 and the fourth barcode element 336, a fourth space 326 between the fourth barcode element 336 and the fifth barcode element 338, and a fifth space 328 adjacent to the fifth barcode element 338. One or more, or each, of the barcode elements and spaces may have the same or different widths. For example, the first barcode element 330 may have a first width 340, the first space 320 may have a second width 342, the second barcode element 332 may have a third width 344, the second space 322 may have a fourth width 346, the third barcode element 334 may have a fifth width 348, the third space 324 may have a sixth width 350, the fourth barcode element 336 may have a seventh width 352, the fourth space 326 may have an eighth width 354, the fifth barcode element 338 may have a ninth width 356, and the fifth space 328 may have a tenth width 358. In some embodiments, the widths of spaces or barcode elements may be predetermined, such as for narrow or wide spaces or barcode elements, while in other embodiments, the widths or spaces may have independent or unique widths. The widths may be used to decode the barcode 300.

The barcode 300 may be scanned with a scanning device, which may result in the digital signal 310. In instances where there is a small distance between the scanning device and the barcode 300, or short range barcode scanning, the digital signal 310 may be a step curve 360. In ideal conditions, the widths of the portions of the step curve 360 may correspond to the widths of the spaces and barcode elements of the barcode 300.

However, as the distance increases, or for long range barcode scanning, the digital signal may be more blurred, or may be a distorted signal 370. Distortion may be convolution distortion and may be a result of aperture size, device frequency limitations, focus issues, distance, and other distortions. The distorted signal 370 may have peaks rather than the flat portions of the step curve 360, and valleys instead of the flat portions of the step curve 360. Embodiments of the disclosure may determine the edges of the barcode elements or spaces using the peaks and valleys of the distorted signal. In some instances, the edges of the barcode elements may not correspond to midpoints between the consecutive peaks and valleys. In addition, distortion may result in subsequent errors, such as sampling errors, printing errors, barcode damage, specula errors, electrical noise, and the like.

In FIG. 3, the distorted signal 370 may include a first valley associated with a first voltage value that corresponds to the first white space 320 and/or first width 340, a first peak associated with a second voltage value that corresponds to the first barcode element 330 and/or second width 342, a second valley associated with a third voltage value that corresponds to the second white space 322 and/or third width 344, a second peak associated with a fourth voltage value that corresponds to the second barcode element 332 and/or fourth width 346, a third valley associated with a fifth voltage value that corresponds to the third white space 324 and/or fifth width 348, a third peak associated with a sixth voltage value that corresponds to the third barcode element 334 and/or sixth width 350, a fourth valley associated with a seventh voltage value that corresponds to the fourth white space 326 and/or seventh width 352, and so forth. In some embodiments, valleys may correspond to bars or dark barcode elements. One or more, or each, pixel in an optical sensor may be associated with a voltage value, which may be a valley, a peak, or in between.

In some embodiments, a first derivative of the distorted signal 370 may be determined and may be represented as first derivative signal 380, as shown in FIG. 3. The first derivative signal 380 may shift peaks and valleys closer to the actual edge locations of the barcode elements and/or spaces. However, the first derivative signal 380 may not be accurate in blurred cases, depending on an accuracy or level of distortion of the distorted signal 370. For example, as shown in the digital signal 310, the second consecutive valley of the first derivative signal is distanced from an actual edge of the second space 322 and/or an edge of the second barcode element 332, as indicated by the distance between the second valley position with respect to the step curve 360 portion that corresponds to the second barcode element 332.

In the detailed view of FIG. 3, a portion of the digital signal corresponding to the third barcode element 334, which may be a narrow barcode element, is depicted. The step curve 360 may have a first portion 362 representing a first valley, or an edge of the third space 324 and/or third barcode element 334, a second portion 364 representing a peak, or a width of the third barcode element 334, and a third portion 366 representing a second valley, or an edge of the fourth space 326 and/or third barcode element 334.

The detailed view includes a portion 390 of the distorted signal 370, and a portion 392 of the first derivative signal 380. As illustrated in the example of FIG. 3, a peak of the distorted signal 370 may be present, but a difference in voltage values between the peak and adjacent valleys may be relatively small, which may make detection of the peak relatively difficult. Similarly, while the illustrated peak of the first derivative signal 380 may align with a leading edge of the third barcode element (at least with respect to the step curve 360), some valleys of the first derivative signal 380 may not aligned with respective trailing edges of barcode elements. Accordingly, in some instances, using the distorted signal 370 and/or the first derivative signal 380 alone to determine the edge locations may be inaccurate.

Figure 4:
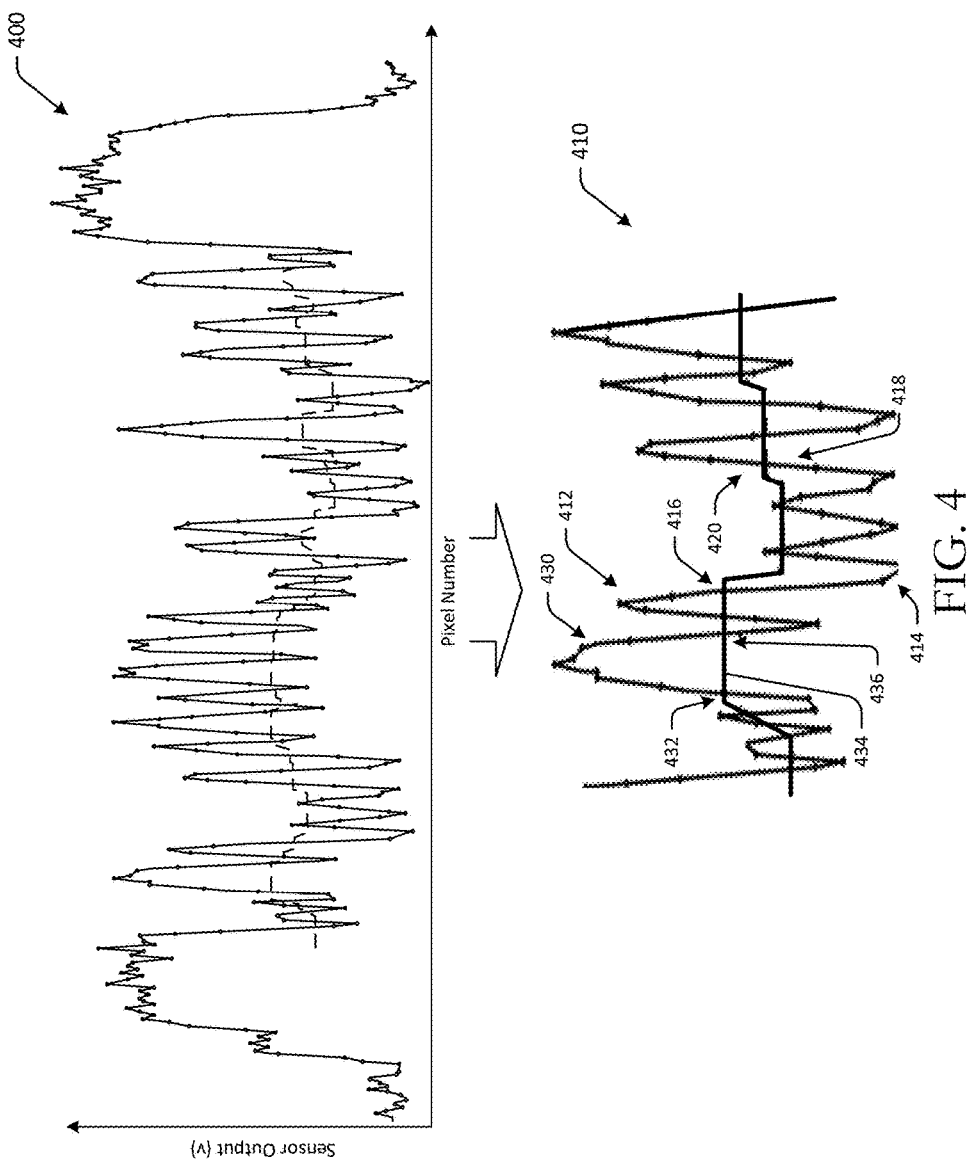
FIG. 4 is a schematic drawing of a signal and related processing to read a barcode from long range in accordance with one or more embodiments of the disclosure.

FIG. 4 is a schematic drawing of a digital signal 400 and related processing to read a barcode from long range in accordance with one or more embodiments of the disclosure. The digital signal 400 of FIG. 4 may represent a barcode, as well as an ambient environment of the barcode. The digital signal 400 may include a number of peaks and valleys, with various differences in voltage between the respective peaks and valleys. Some of the peaks and valleys may be a result of signal noise, while other peaks and valleys may be caused by an ambient environment or surroundings of a barcode. Accordingly, in some instances, only a portion of the digital signal 400 may correspond to the barcode. Each data point in FIG. 4 may represent a voltage value that corresponds to reflected light that is detected by a, in one example, pixel of an optical sensor. The data point may be at a peak, a valley, or in between a peak and a valley. Peaks and valleys may be determined by walking through (e.g., from left to right, or from a first pixel to a last pixel, etc.) the signal and identifying local peaks and valleys.

To accurately determine the edges of the barcode elements or spaces using the digital signal 400, even with the signal noise, one or more narrow barcode elements may be determined or identified. A narrow barcode element may be the leading and trailing edges of a narrow barcode element, as opposed to the edges of a wide barcode element. Narrow barcode elements may be identified based at least in part on modulation of the digital signal 400. For example, the narrow barcode elements may have a relatively small modulation in the digital signal. Narrow barcode elements may be found, for example, in one-dimensional barcode symbologies, such as UPC, code 128, code 39, and other barcode symbologies. In some instances, narrow barcode elements may be found in start or stop regions of a barcode. For example, a scanning device or a connected computer system may determine that a first peak 412 to a second valley represents a first narrow barcode element of the barcode. The scanning device may determine that the first peak 412 represents the first narrow barcode element by determining a modulation value of the digital signal between a first valley and a second valley adjacent to the first peak 412, or between adjacent peaks. The modulation may be compared to a narrow barcode element threshold to determine whether the narrow barcode element threshold is satisfied, and, if so, the first peak 412 may be determined to be a narrow barcode element. In the example of FIG. 3, the width 350 may represent a narrow barcode element with narrow-to-narrow edges (e.g., third white space 324 to third barcode element 334, third barcode element 334 to fourth space 326, etc.).

After the narrow barcode element is identified, a midpoint or a second derivative zero crossing may be determined so as to identify the edges of the narrow barcode element using the digital signal 400. The midpoints may be between a peak and adjacent valleys (or between a valley and adjacent peaks) of the digital signal 400 corresponding to the narrow barcode element. The second derivative zero crossing may be a second derivative of the digital signal 400, and may include peaks or valleys that correspond to the estimated edge locations of the narrow barcode element. The midpoints may also be used to estimate the edges of the narrow barcode element. Second derivative zero crossings or midpoints may be used to estimate the narrow barcode element edges because a likelihood of error may be reduced for narrow barcode elements or spaces, as opposed to wide barcode elements or spaces. In one embodiment, a midpoint may be determined by averaging a voltage value of a neighboring peak and a voltage value of a neighboring valley, where the peak and valley are associated with an edge of a barcode element, such as a narrow barcode element. The midpoints may be used as a threshold to determine a border location of a bar and space associated with the edge.

After the estimated edges of the narrow barcode element are determined, either using the midpoints or the second derivative zero crossing, the midpoint or second derivative zero crossing may be used to set or establish a local threshold for narrow barcode elements that are included in the barcode or otherwise represented by the digital signal 400.

Using the threshold, the midpoints or second derivative zero crossing may be connected with one or more line segments, or a path between the midpoints may be determined. As shown in the detailed portion 410 of the digital signal 400, the line segments may connect respective estimated edges of the narrow barcode elements in the digital signal 400.

The intersection points between the line segments and the portions of the digital signal representing the non-narrow barcode elements or spaces may be determined to be local wide barcode element thresholds. For example, an intersection point between a line segment and a portion of the digital signal 400 corresponding to a wide barcode element may be determined to be an edge of the wide barcode element or space. The intersection point may be used instead of estimating an edge location of the wide barcode element using a midpoint value or other technique. The intersection point(s) may be more accurate in identifying or determining the edge locations for the non-narrow barcode elements or spaces.

In some instances, a peak value may be positioned such that there is no intersection point between the portion of the digital signal adjacent to the peak and a line segment. In such instances, line segments may be shifted upwards or downwards, as needed, to create one or more intersection points. For example, line segments may be shifted a certain percentage (e.g., +/−10%, 15%, 25%, etc.) so as to ensure intersection points. In other embodiments, line segments may be shifted based at least in part on average peak values, average valley values, and other metrics. Line segment values may be voltage values associated with a particular line segment.

A first edge position of a first narrow barcode element may be determined along a first portion of the digital signal between the first peak 412 and an adjacent valley 414. The first edge position may correspond to a midpoint 416. For example, a first midpoint of the digital signal between the valley 414 and the first peak 412 may be determined and used to determine the first edge position using the midpoint 416. A second edge position of a second narrow barcode element along a second portion 418 of the digital signal may be determined. The second edge position may correspond to a midpoint 420.

A line segment may be generated that connects the midpoint 416 to the midpoint 420. The line segment may be a straight line segment. However, as shown in the example of FIG. 4, the line segment may be shifted downwards so as to be associated with a voltage value that is less than the value of the two peaks between the midpoint 416 and the midpoint 420 in FIG. 4. As a result, the two peaks may intersect the line segment. In other embodiments, the line segment may not be shifted, such as when the intervening peaks are associated with values that are greater than the value of the line segment.

To determine the edge locations of the wide barcode elements or spaces, or the non-narrow barcode elements or spaces, intersection points may be determined. For example, a peak 430 may correspond to a wide barcode element. A first intersection point 432 between the voltage signal or digital signal and a path 434 may be determined. The first intersection point 432 may correspond to a first edge of the wide barcode element. A second intersection point 436 between the voltage signal or digital signal and the path 434 may be determined. The second intersection point 436 may correspond to a second edge of the wide barcode element. In one example, a threshold that may be used to identify non-narrow barcode element edges may be determined using the value on the line segment in the local area of the edge, and can be adjusted by local peak and/or valley values. In some embodiments, a border between bar and space locations may be determined. Border locations may be defined on an X-axis of the graph and may be determined using a cross point or intersection between the digital signal portion representing an edge and the threshold formed by the line segment (which may be a horizontal line). Linear interpolation may be used to increase accuracy in some embodiments.

A length of the path 434, or a distance between the respective midpoints, may be used to determine the widths of the barcode elements or spaces represented by the path. For example, a first length of the path 434 may be determined, and may correspond to a first width of the wide barcode element. In another example, a distance between a midpoint and an intersection point may be determined, where the distance may correspond to a width of a white space or a barcode element. In some embodiments, the path 434 may not be horizontal, in which case rather than using a length of the path 434, the length multiplied by a cosine of an angle between the path and the X-axis may be used to determine a width of the line as measured along the X-axis. Widths of paths or line segments, including consecutive paths or line segments, may be determined and used to determine the widths of the barcode elements or spaces. In some embodiments, the distances between the determined midpoints or edge locations may be used to calculate or otherwise determine the widths of the barcode elements or spaces. Widths may be determined by subtracting X-axis coordinates of edge locations in an example. In some embodiments, barcode element widths may be determined by the X-axis distance between i) an intersection between a trailing edge signal and the line segment, and ii) the intersection or cross point of the leading edge signal and the line segment.

Figure 5:
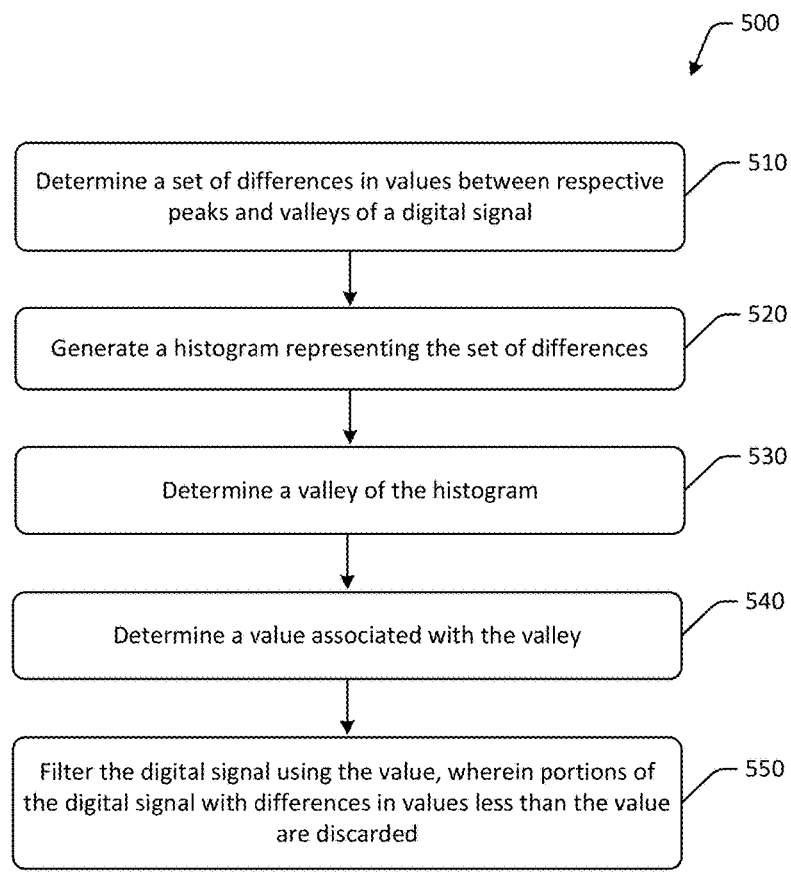
FIG. 5 is an example process flow for generating a histogram in accordance with one or more embodiments of the disclosure.
Figure 6:
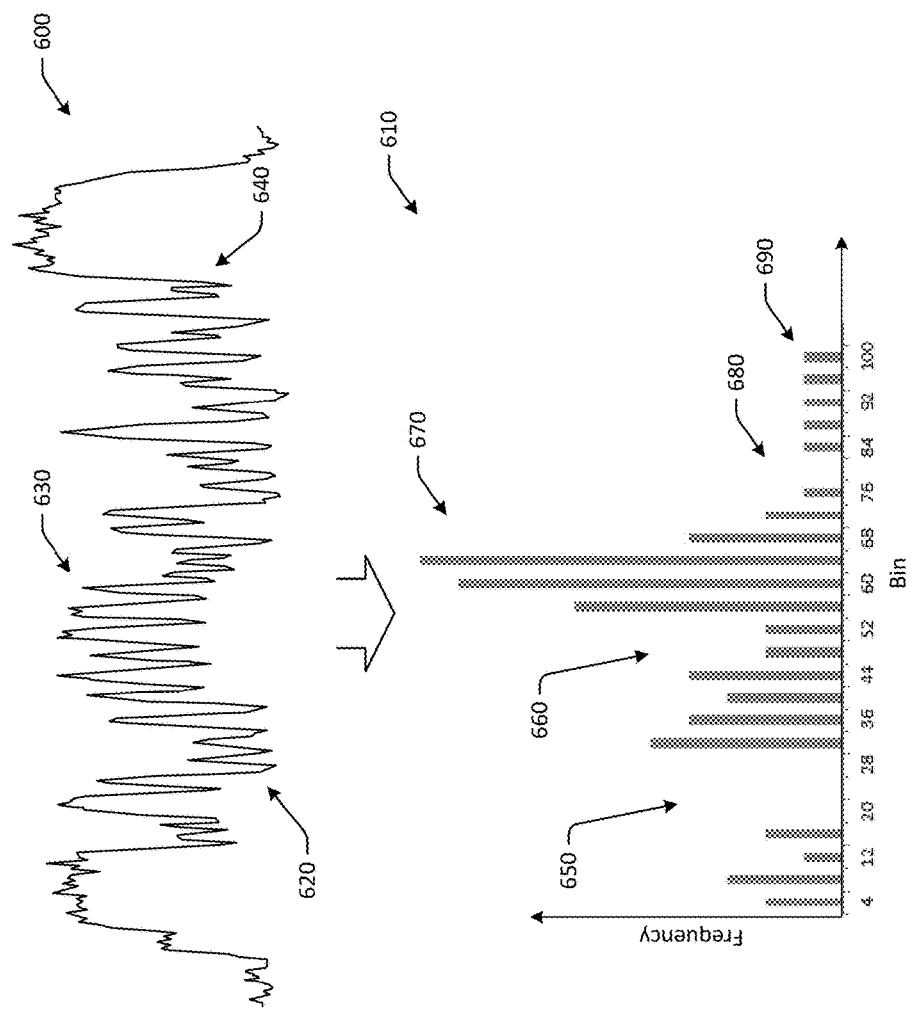
FIG. 6 is a schematic drawing of an example signal and a histogram in accordance with one or more embodiments of the disclosure.

FIG. 5 is an example process flow 500 for generating a histogram in accordance with one or more embodiments of the disclosure. FIG. 6 is a schematic drawing of an example digital signal 600 and a histogram 610 in accordance with one or more embodiments of the disclosure, and will be discussed in conjunction with FIG. 5. Some or all of the operations of the process flow 500 may be executed in any order to generate a histogram based at least in part on a digital signal or voltage signal that represents a barcode. The histogram may plot peak-to-valley differences or changes in voltage for pairs of peaks and valleys in a digital signal. The process flow 500 may be used, in one example, to identify signal noise and filter and/or otherwise process a signal by removing the signal noise. Signal noise may be caused by any number of factors, including, but not limited to, barcode damage or related surface damage (e.g., stains, smears, etc.), ambient light, and other factors.

At block 510, a set of differences in values between respective peaks and valleys of a digital signal may be determined. The difference may be a difference in voltage value and may be determined by subtracting the voltage value of a valley from the voltage value of an adjacent peak. Differences in voltage values may be determined or calculated for one or more, or all, pairs of peaks and valleys. In one embodiment, the computer-executable instructions of one or more threshold module(s) stored at a server or locally on a scanning device may be executed to determine the differences in the values between pairs of peaks and valleys in a digital signal. For example, FIG. 6 includes the digital signal 600. Differences in pairs of peaks and valleys of the digital signal 600 may be determined. In some embodiments, a delta, or a difference, between a peak and a neighboring valley may be determined, along with a delta between the neighboring valley and an adjacent peak.

To determine the differences, peaks and valleys may be identified. For example, in the digital signal 600, a first peak, a first valley, and a second peak may be determined. A first difference in voltage between the first valley and the first peak may be determined, a second difference in voltage between the first peak and the second valley may be determined, and a third difference in voltage between the second valley and the second peak may be determined.

At block 520, a histogram representing the set of differences may be determined. For example, the computer-executable instructions of one or more threshold module(s) stored at a server or locally on a scanning device may be executed to generate a histogram representing the set of differences. In some embodiments, the histogram may be smoothed or otherwise processed using a filter.

An example histogram 610 is depicted in FIG. 6. The histogram 610 may plot a frequency of occurrence of various difference values. For example, in the histogram 610, a voltage difference of 22 millivolts may occur zero times, or at a frequency of zero, while a voltage difference of 64 millivolts may be a most frequently occurring difference. The histogram 610 may represent at least a portion of the digital signal 600. For example, a first portion 620 of the digital signal 600 may have a relatively small difference value between the peak and valley, while a second portion 630 and a third portion 640 of the digital signal 600 may have relatively larger difference values between respective peaks and valleys. The histogram 610 may capture the variations and frequency of occurrence of the differences between peaks and valleys in the digital signal 600.

At block 530, a valley of the histogram may be determined. For example, the computer-executable instructions of one or more threshold module(s) stored at a server or locally on a scanning device may be executed to determine a valley of the histogram. A valley of the histogram may be a local low value in frequency of occurrence of a certain difference or range of differences in value. In FIG. 6, a first portion 650 of the histogram 610 may be determined to be a valley of the histogram. The first portion 650 may be a local low value for frequency of occurrence in the histogram 610. A second portion 660 of the histogram 610 may also be determined to be a valley of the histogram. In some embodiments, more than one valley of the histogram 610 may be determined. In such embodiments, valleys may be determined iteratively. An additional example of a valley includes a third portion 680 of the histogram 610.

In some embodiments, a representation may be used instead of the histogram. For example, one or more bin values may be determined, and the respective voltage differences may be classified, categorized, or otherwise sorted into the one or more bin values. In some instances, the difference values may be sorted into a closest bin value. In an example, 100 difference values may be binned into one of ten separate bins. A difference of 0.12 mV may be binned in a bin associated with a bin value of 0.10 mV, while a difference of 0.29 mV may be binned in a bin associated with a bin value of 0.30 mV. The bin associated with the least number of difference values may be the "valley" of the histogram. This is because if the bin values were plotted as a histogram, the bin value would have the least number of difference values associated with the bin.

At block 540, a histogram value associated with the valley may be determined. For example, the computer-executable instructions of one or more threshold module(s) stored at a server or locally on a scanning device may be executed to determine a histogram value associated with the valley. In the example of FIG. 6, the value associated with the first portion 650 may be 24 millivolts, whereas the value associated with the second portion 660 may be 50 millivolts, and so forth. The value may be used, for example as a minimum voltage difference threshold, to filter the digital signal 600. For example, portions of the digital signal with difference values less than the value of the valley may be determined to correspond to signal noise. In some embodiments, signal noise may be discarded, deleted, or otherwise ignored. The value may be determined based at least in part on the set of differences, as represented by the histogram 610.

At block 550, the digital signal may be filtered using the value, where portions of the digital signal with differences in values less than the value are discarded. The value may be used as a minimum voltage difference or a signal noise threshold, where differences in peaks and valleys equal to or less than, or less than, the value are determined to correspond to signal noise. For example, the computer-executable instructions of one or more threshold module(s) stored at a server or locally on a scanning device may be executed to filter the digital signal using the value. In FIG. 6, if the third portion 680 was determined to be the value, a portion of the digital signal with differences greater than (or less than, in some embodiments) the third portion 680 (e.g., the portion of the digital signal corresponding to a fourth portion 690 of the histogram 610, etc.) may be discarded or otherwise ignored. In another example, if the first portion 650 is the valley and the associated value is 20, then the portion of the digital signal corresponding to the differences less than 20 may be discarded. If, after filtering the digital signal 600 using the first portion 650 of the histogram 610 as the valley, the barcode cannot be decoded or is unidentifiable, or a related product cannot be identified, the second portion 660 (that may be greater than the first portion 650) may be used as the valley, and an associated value may be used to filter the digital signal 600. In some embodiments, the peaks or valleys with deltas or differences less than the threshold value may be ignored, while all other peaks and valleys may be determined and/or recorded.

In some embodiments, the histogram 610 may be used to identify a most likely difference for barcode elements. For example, peaks and valleys of the digital signal corresponding to the portion 670 of the histogram 610 may be determined to be wide barcode elements, along with adjacent difference values (e.g., 60 mV, 56 mV, etc.).

In some embodiments, narrow barcode elements may be determined in a digital signal using the histogram (e.g., using the minimum delta in one example, etc.). For example, a leading or trailing edge of a narrow barcode element may be determined based at least in part on the digital signal and the histogram.

As a result, the digital signal 600 may be filtered or otherwise processed for increased accuracy and reduced noise. Therefore, the scanned barcode can be read with increased accuracy and from greater distances.

Figure 7:
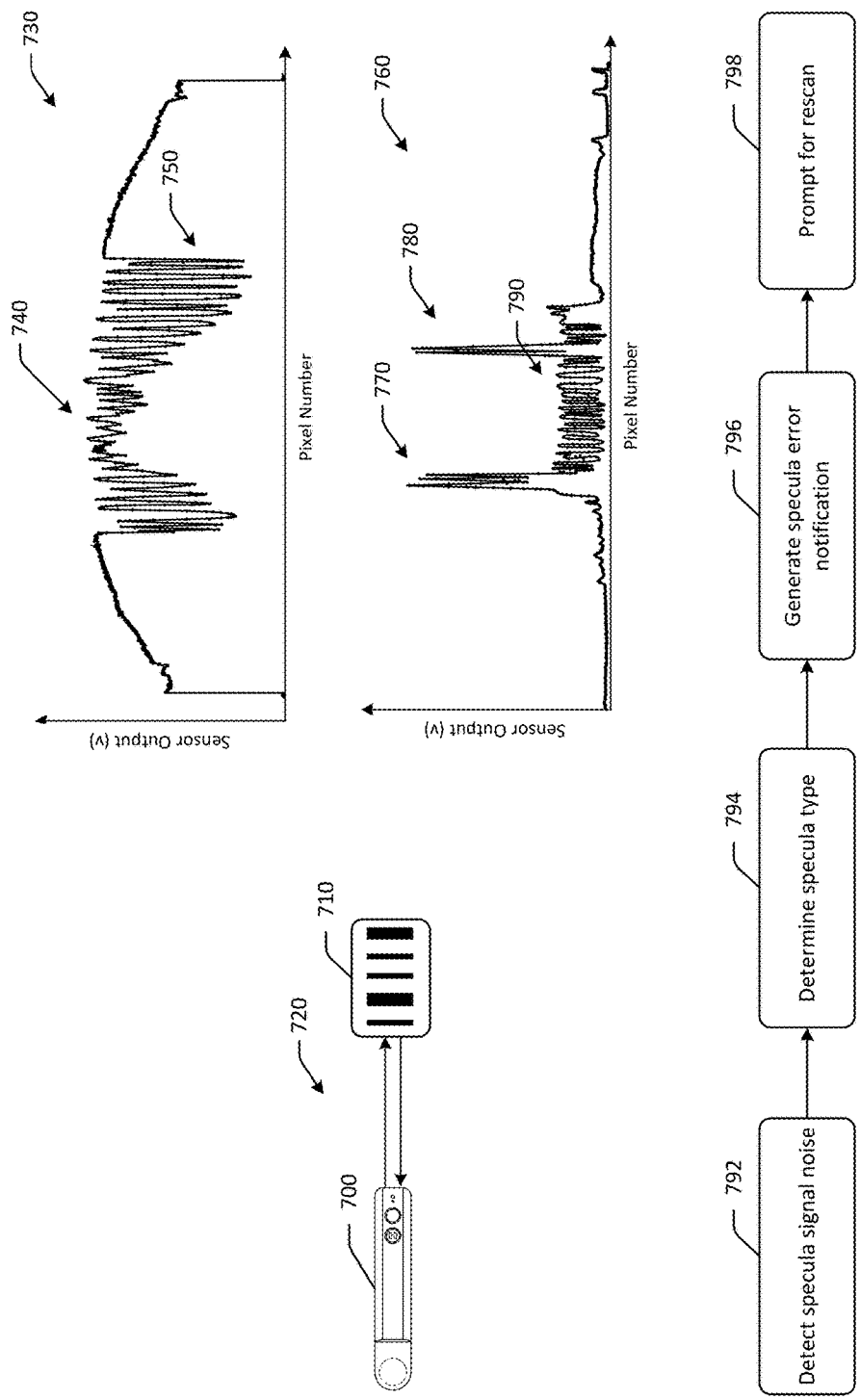
FIG. 7 is a hybrid schematic drawing of an example process flow for detecting specula and example signals in accordance with one or more embodiments of the disclosure.

FIG. 7 is a hybrid schematic drawing of an example process flow for detecting specula and example digital signals in accordance with one or more embodiments of the disclosure. In FIG. 7, a scanning device 700 may be used to scan a barcode 710 at a substantially perpendicular angle 720. As a result, some light emitted by the scanning device 700 may be directly reflected from the barcode 710 back to the scanning device 700. The direct reflection may cause errors, such as specula-related errors, in reading or decoding the barcode 710.

For example, a first digital signal 730 is an example of a specula error and is determined by the scanning device 700. It may represent a dark signal that is detected as a lighter color for portions of the barcode. For example, in the first digital signal 730, a first portion 750 of the signal may have "normal" differences between peaks and valleys, which can be used to determine or distinguish barcode elements from spaces. However, a second portion 740 of the signal may have relatively less differences between peaks and valleys, which may cause the dark barcode elements to appear as light spaces, or the light spaces to appear as dark barcode elements. Decoding the barcode may be difficult as a result of the reduced peak to valley differences. In some embodiments, narrow barcode elements may be determined, and the corresponding signal amplitude may be compared to the signal amplitude in the start or stop regions of the barcode. If the signal amplitude is significantly smaller than the signal amplitude in the start or stop regions, the digital signal may be the result of specula error.

A second digital signal 760 is another example of specula error which results in spikes in the digital signal. The spikes may be caused by random bright or dark spots as a result of direct light reflection. For example, a first spike 770 may have a voltage value significantly greater than a majority portion 790 of the second digital signal 760. Similarly, a second spike 780 may have a voltage value that is also significantly greater than the majority portion 790 of the second digital signal 760.

To detect and/or prevent specula-related barcode reading errors, at a first operation 792, specula signal noise may be detected. Specula signal noise may be determined by determining whether any spikes exist in the digital signal, or whether any portions of the digital signal have significantly smaller differences between peaks and valleys. In one example, specula signal noise may be determined using a maximum value specula threshold indicative of a maximum voltage value that is acceptable for a digital signal. A maximum voltage value may be determined by averaging voltage values associated with peaks of the portion of the signal that correspond to the barcode. For example, voltage values associated with peaks of the signal may be averaged after signal noise and/or outliers are removed and/or ignored. The average value, or a multiple of the average value or any number greater than the average value, may be used as the maximum voltage value threshold. If the digital signal has peaks with values greater than the maximum value specula threshold, the digital signal may be determined to have a specula error. In another example, a maximum voltage difference or a maximum voltage threshold may be used to identify a specula signal error. In another example, the signal amplitude may be compared in different regions of the digital signal to identify a specula signal error. For example, a minimum difference specula threshold or a signal amplitude threshold may be used to determine whether any peak to valley differences are below a minimum difference specula threshold or a signal amplitude threshold. The minimum difference specula threshold may be determined based at least in part on leading and/or trailing edge modulations of a narrow barcode element. The minimum difference specula threshold may represent a minimum difference between adjacent peaks and valleys that correspond to a barcode element so as to accurate determine which portions of the signal correspond to dark barcode elements and which portions of the signal correspond to light barcode elements. For example, if the difference is less than the minimum difference specula threshold, a black barcode element may be associated with a voltage value that is similar to a light barcode element, or vice versa, thereby making it difficult to determine whether the local region of the signal corresponds to a dark or light barcode element.

At a second operation 794, a specula type may be determined. For example, if the modulation of the digital signal is small, the specula type may be determined to be similar to that of the first digital signal 730, whereas if the digital signal has one or more spikes, the specula type may be determined to be similar to that of the second digital signal 760.

At a third operation 796, a specula error notification may be generated. For example, the scanning device 700 may generate a visual or audible error notification indicative of the specula error.

At a fourth operation 798, a prompt for rescanning the barcode 710 may be presented. For example, a user may be prompted to rescan the barcode 710 as a result of the specula error. In some embodiments, the user may be instructed to avoid scanning the barcode at a perpendicular angle, so as to avoid specula-related errors.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
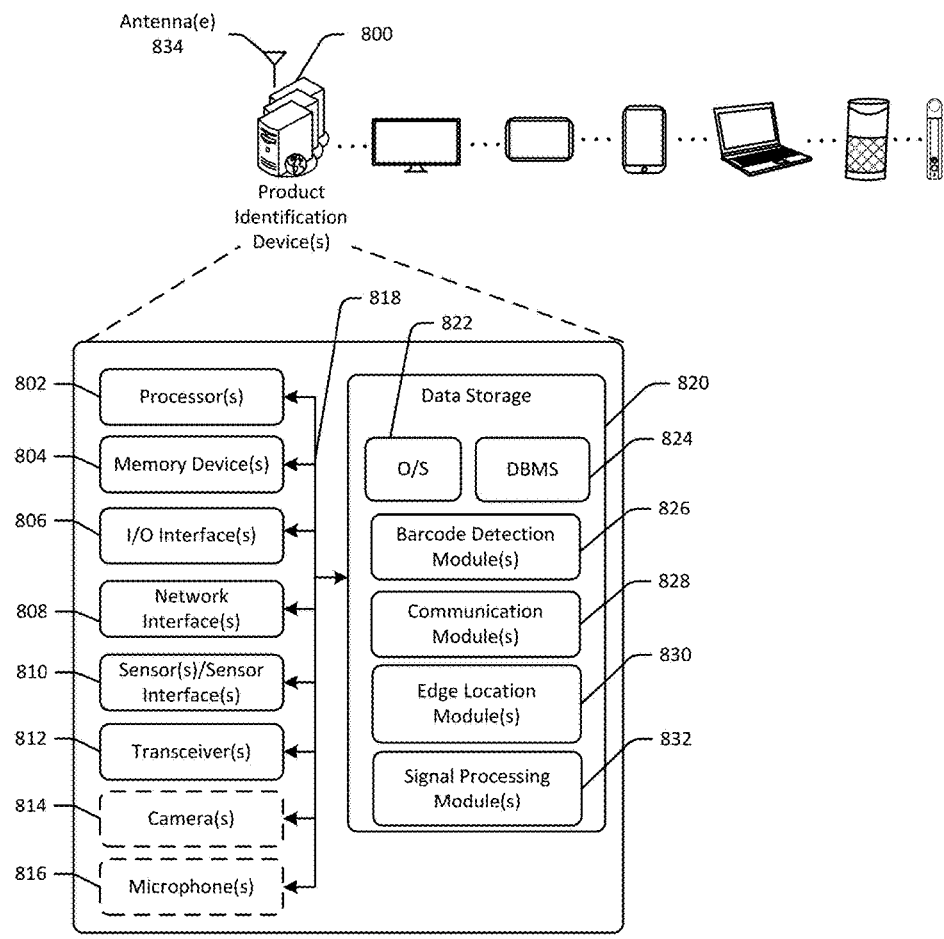
FIG. 8 schematically illustrates an example architecture of an electronic device in accordance with one or more embodiments of the disclosure.

FIG. 8 is a schematic block diagram of one or more illustrative product identification device(s) 800 in accordance with one or more example embodiments of the disclosure. The product identification device(s) 800 may include any suitable computing device including, but not limited to, a server system, a mobile device such as a smartphone, a tablet, an e-reader, a wearable device, or the like; a desktop computer; a laptop computer; a content streaming device; a set-top box; a scanning device; a barcode scanning wand; or the like. The product identification device(s) 800 may correspond to an illustrative device configuration for the scanning device of FIGS. 1-7.

The product identification device(s) 800 may be configured to communicate with one or more servers, user devices, or the like. The product identification device(s) 800 may be configured to determine product identifiers, scan or decode barcodes, read product identifiers, trigger purchases or orders, reorder products, process digital and analog signals, and other operations. The product identification device(s) 800 may be configured to emit light, detect reflected light, output a voltage signal, and other functionality. In some embodiments, a single remote server or a single group of remote servers may be configured to perform more than one type of product identification functionality in conjunction with a barcode scanning device.

The product identification device(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the product identification device(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional camera(s) 814, one or more optional microphone(s) 816, and data storage 820. The product identification device(s) 800 may further include one or more bus(es) 818 that functionally couple various components of the product identification device(s) 800. The product identification device(s) 800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the product identification device(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the product identification device(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more barcode detection module(s) 826, one or more communication module(s) 828, one or more edge location module(s) 830, and/or one or more signal processing module(s) 832. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the product identification device(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, an example datastore(s) may include, for example, historical data for previously identified products, purchase or order history, user profile information, and/or other information.

The processor(s) 802 may be configured to access the memory 804 and execute the computer-executable instructions loaded therein. For example, the processor(s) 802 may be configured to execute the computer-executable instructions of the various program module(s), applications, engines, or the like of the product identification device(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the barcode detection module(s) 826 may include computer-executable instructions, code, or the like that responsive to execution by one or more of the processor(s) 802 may perform functions including, but not limited to, controlling operation of a light source, such as an LED, controlling operation of a light sensor, such as one or more photocells, determining a voltage signal, determining portions of a voltage signal that correspond to a barcode or other product identifier, filtering the digital signal, communicating with remote servers, and the like.

The communication module(s) 828 may include computer-executable instructions, code, or the like that responsive to execution by one or more of the processor(s) 802 may perform functions including, but not limited to, sending and/or receiving data, including content, sending and/or receiving instructions and commands, and the like.

The edge location module(s) 830 may include computer-executable instructions, code, or the like that responsive to execution by one or more of the processor(s) 802 may perform functions including, but not limited to, generating graphs using digital signals, determining midpoints of portions of a digital signal, determining peak and/or valley values, identifying barcode edge positions, determining barcode element and space widths, and the like.

The signal processing module(s) 832 may include computer-executable instructions, code, or the like that responsive to execution by one or more of the processor(s) 802 may perform functions including, but not limited to, identifying peaks and valleys in a signal, determining and discarding signal noise, generating histograms, determining threshold values, and the like.

Referring now to other illustrative components depicted as being stored in the data storage 820, the O/S 822 may be loaded from the data storage 820 into the memory 804 and may provide an interface between other application software executing on the product identification device(s) 800 and the hardware resources of the product identification device(s) 800. More specifically, the O/S 822 may include a set of computer-executable instructions for managing the hardware resources of the product identification device(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the product identification device(s) 800 is a mobile device, the DBMS 824 may be any suitable lightweight DBMS optimized for performance on a mobile device.

Referring now to other illustrative components of the product identification device(s) 800, the input/output (I/O) interface(s) 806 may facilitate the receipt of input information by the product identification device(s) 800 from one or more I/O devices as well as the output of information from the product identification device(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the product identification device(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The product identification device(s) 800 may further include one or more network interface(s) 808 via which the product identification device(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(e) 834 may include any suitable type of antenna depending, for example, on the communications protocols used to transmit or receive signals via the antenna (e) 834. Non-limiting examples of suitable antennae may include directional antennae, non-directional antennae, dipole antennae, folded dipole antennae, patch antennae, multiple-input multiple-output (MIMO) antennae, or the like. The antenna(e) 834 may be communicatively coupled to one or more transceivers 812 or radio components to which or from which signals may be transmitted or received.

As previously described, the antenna(e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 834 may be configured to transmit or receive radio frequency signals within any suitable frequency range forming part of the unlicensed portion of the radio spectrum.

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the product identification device(s) 800 to communicate with other devices. The transceiver(s) 812 may include hardware, software, and/or firmware for modulating, transmitting, or receiving—potentially in cooperation with any of antenna(e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the product identification device(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The camera(s) 814 may be any device configured to capture ambient light or images. The microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the product identification device(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the product identification device(s) 800 may include alternate and/or additional hardware, software, or firmware components beyond those described or depicted without departing from the scope of the disclosure. More particularly, it should be appreciated that software, firmware, or hardware components depicted as forming part of the product identification device(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7 may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A barcode scanning device comprising:
a light emitting diode (LED);
an optical sensor;
at least one memory that stores computer-executable instructions; and
at least one processor configured to access the at least one memory and execute the computer-executable instructions to:
cause the LED to emit light toward a barcode on a surface of an object, wherein the barcode comprises a first white barcode element, a second white barcode element, a third white barcode element, a first black barcode element positioned between the first white barcode element and the second white barcode element, and a second black barcode element positioned between the second white barcode element and the third white barcode element;
detect a portion of the light that is reflected from the surface using the optical sensor, wherein the optical sensor is configured to output a voltage signal representative of the portion of the light, the voltage signal comprising a first valley associated with a first voltage value, a first peak associated with a second voltage value, a second valley associated with a third voltage value, a second peak associated with a fourth voltage value, a third valley associated with a fifth voltage value, a third peak associated with a sixth voltage value, and a fourth valley associated with a seventh voltage value;
determine that a first difference between the first voltage value and the second voltage value is less than or equal to a narrow barcode element threshold;
determine that a second difference between the second voltage value and the third voltage value is less than or equal to the narrow barcode element threshold;
determine a first midpoint of the voltage signal between the first valley and the first peak, wherein the first midpoint corresponds to a first leading edge of the first white barcode element;
determine a second midpoint of the voltage signal between the first peak and the second valley, wherein the second midpoint corresponds to a first trailing edge of the first white barcode element;
determine that a third difference between the fifth voltage value and the sixth voltage value is less than or equal to the narrow barcode element threshold;
determine that a fourth difference between the sixth voltage value and the seventh voltage value is less than or equal to the narrow barcode element threshold;
determine a third midpoint of the voltage signal between the third valley and the third peak, wherein the third midpoint corresponds to a second leading edge of the third white barcode element;
determine a fourth midpoint of the voltage signal between the third peak and the fourth valley, wherein the fourth midpoint corresponds to a second trailing edge of the third white barcode element;
determine a first intersection between the voltage signal and a path between the second midpoint and third midpoint, wherein the first intersection corresponds to a third leading edge of the second white barcode element; and
determine a second intersection between the voltage signal and the path, wherein the second intersection corresponds to a third trailing edge of the third white barcode element.

2. The barcode scanning device of claim 1, wherein the at least one processor is further configured to access the at least one memory and execute the computer-executable instructions to:
determine a first distance between the first midpoint and the second midpoint, wherein the first distance corresponds to a first width of the first white barcode element;
determine a second distance between the second midpoint and the first intersection, wherein the second distance corresponds to a second width of the first black barcode element;
determine a third distance between the first intersection and the second intersection, wherein the third distance corresponds to a third width of the second white barcode element;

determine a fourth distance between the second intersection and the third midpoint, wherein the fourth distance corresponds to a fourth width of the second black barcode element;

determine a fifth distance between the second midpoint and the third midpoint, wherein the fifth distance corresponds to a fifth width of the third white barcode element; and determine a product identifier using the first width, the second width, the third width, the fourth width, and the fifth width.

3. The barcode scanning device of claim 1, wherein the at least one processor is further configured to access the at least one memory and execute the computer-executable instructions to:

determine a fourth difference between the third voltage value and the fourth voltage value;

determine a set of bin values, wherein the set of bin values comprises individual bin values associated with different voltages;

determine that the first difference is closest to a first bin value;

determine that the second difference is closest to a second bin value;

determine that the third difference is closest to the first bin value;

determine that the fourth difference is closest to the first bin value;

determine that the second bin value is associated with the least number of differences;

determine a minimum voltage difference threshold using the second bin value;

determine that the fourth difference is less than the minimum voltage difference threshold;

determine that the second peak corresponds to signal noise; and discard a portion of the voltage signal associated with the second peak.

4. The barcode scanning device of claim 1, wherein the at least one processor is further configured to access the at least one memory and execute the computer-executable instructions to:

determine an average voltage value for peaks corresponding to the barcode;

determine that the third voltage value is greater than a maximum voltage value threshold, wherein the maximum voltage value threshold is the average voltage value;

determine that the second peak corresponds to specula signal noise; and generate an error notification.

5. A device comprising:

at least one memory that stores computer-executable instructions; and at least one processor configured to access the at least one memory and execute the computer-executable instructions to:

determine a signal representative of a portion of light reflected from a barcode;

determine a first value at a first valley of the signal, a second value at a first peak of the signal, a third value at a second valley of the signal, a fourth value at a second peak of the signal, a fifth value at a third valley of the signal, a sixth value at a third peak of the signal, and a seventh value at a fourth valley of the signal;

determine that the first peak represents a first narrow barcode element of the barcode;

determine that the third peak represents a second narrow barcode element of the barcode;

determine a first midpoint of the signal between the first valley and the first peak;

determine a first edge position of the first narrow barcode element using the first midpoint, wherein the first edge position is along a first portion of the signal between the first peak and the second valley;

determine a second edge position of the second narrow barcode element along a second portion of the signal between the third peak and the fourth valley; and determine a path between first edge position and the second edge position, wherein the fourth value at the second peak is greater than an eighth value along the path.

6. The device of claim 5, wherein the at least one processor is further configured to access the at least one memory and execute the computer-executable instructions to:

determine that the second peak represents a wide barcode element;

determine that the second valley represents a first space adjacent to the first narrow barcode element;

determine that the third valley represents a second space adjacent to the second narrow barcode element;

determine a product identifier using the first narrow barcode element, the first space, the wide barcode element, the second space, and the second narrow barcode element.

7. The device of claim 5, wherein the at least one processor is further configured to access the at least one memory and execute the computer-executable instructions to:

determine a first intersection point between the path and a first portion of the signal between the second valley and the second peak;

determine a first edge of a wide barcode element using the first intersection point;

determine a second intersection point between the path and a second portion of the signal between the second peak and the third valley; and determine a second edge of the wide barcode element using the second intersection point.

8. The device of claim 5, wherein the at least one processor is configured to determine the second edge position of the second narrow barcode element along the second portion of the signal between the third peak and the fourth valley by executing the computer-executable instructions to:

determine a second midpoint of the signal between the third valley and the first second peak; and determine the second edge position using the second midpoint.

9. The device of claim 5, wherein the at least one processor is configured to determine the second edge position of the second narrow barcode element along the second portion of the signal between the third peak and the fourth valley by executing the computer-executable instructions to:

determine a first derivative signal of the signal;

determine a first peak of the first derivative signal; and determine the second edge position using the first peak of the first derivative signal.

10. The device of claim 5, wherein the at least one processor is configured to determine that the first peak corresponds to the first narrow barcode element by executing the computer-executable instructions to:

determine a modulation value of the signal between the first valley and the second valley; and determine that the modulation value satisfies a narrow barcode element threshold.

11. The device of claim 5, wherein the at least one processor is further configured to access the at least one memory and execute the computer-executable instructions to:

determine a set of differences in values between respective peaks and valleys of the signal;

classify the set of differences into one or more bin values;

determine a bin value associated with the least number of differences;

determine a bin voltage value associated with the bin value; and filter the signal using the bin voltage value, wherein portions of the signal with differences in values less than the bin voltage value are discarded.

12. The device of claim 5, wherein the at least one processor is further configured to access the at least one memory and execute the computer-executable instructions to:

determine that the fourth value at the second peak satisfies a maximum value specula threshold; and generate an error notification.

13. The device of claim 5, wherein the at least one processor is further configured to access the at least one memory and execute the computer-executable instructions to:

determine that a difference between the fourth value at the second peak of the signal and a fifth value at the third valley of the signal satisfies a minimum difference specula threshold; and generate an error notification.

14. The device of claim 5, wherein the at least one processor is further configured to access the at least one memory and execute the computer-executable instructions to:

cause a light source to emit light; and detect the portion of light reflected off of the barcode, wherein the at least one processor is configured to determine the signal using at least the portion of light reflected off of the barcode.

15. A device comprising:

at least one memory that stores computer-executable instructions; and at least one processor configured to access the at least one memory and execute the computer-executable instructions to:

determine a voltage signal representing a barcode;

determine a first peak, a first valley, a second peak, and a second valley of the voltage signal;

determine a first difference in voltage between the first valley and the first peak;

determine a second difference in voltage between the first peak and the second valley;

determine a third difference in voltage between the second valley and the second peak;

determine a minimum voltage difference threshold using the first difference, the second difference, and the third difference;

determine that the third difference is less than the minimum voltage difference;

determine that the second peak corresponds to signal noise; and determine a barcode value using the voltage signal.

16. The device of claim 15, wherein the barcode value is a first barcode value, and wherein the at least one processor is further configured to access the at least one memory and execute the computer-executable instructions to:

determine that the first barcode value is unidentifiable;

increase the minimum voltage difference threshold; and determine a second barcode value using the voltage signal.

17. The device of claim 15, wherein the voltage signal further comprises a third peak, and wherein the at least one processor is further configured to access the at least one memory and execute the computer-executable instructions to:

determine a fourth difference in voltage between the second peak and the second valley;

determine a fifth difference in voltage between the second valley and the third peak;

determine a maximum voltage difference threshold using an average of the first difference, the second difference, the third difference, the fourth difference, and the fifth difference;

determine that the fifth difference is greater than the maximum voltage difference; and determine that the third peak corresponds to signal noise.

18. The device of claim 15, wherein the voltage signal further comprises a third peak, and wherein the at least one processor is further configured to access the at least one memory and execute the computer-executable instructions to:

determine that a voltage value at the third peak is greater than a maximum voltage value threshold;

determine that the third peak is specula signal noise; and generate an error notification.

19. The device of claim 15, wherein the voltage signal further comprises a third peak and a third valley, and wherein the at least one processor is further configured to access the at least one memory and execute the computer-executable instructions to:

determine that the first valley, the first peak, and the second valley correspond to a first barcode element at an end of the barcode;

determine a signal amplitude threshold using the first valley, the first peak, and the second valley;

determine that the second valley, the third peak, and the third valley correspond to a second barcode element;

determine that a signal amplitude of the second barcode element is less than the signal amplitude threshold; and generate a specula error notification.

20. The device of claim 15, wherein the at least one processor is further configured to access the at least one memory and execute the computer-executable instructions to:

discard a portion of the voltage signal that corresponds to the signal noise.

* * * * *